Dec. 27, 1927.
J. G. PATY
1,654,307
FUEL SUPPLY INDICATOR
Filed Dec. 7, 1925
2 Sheets-Sheet 1
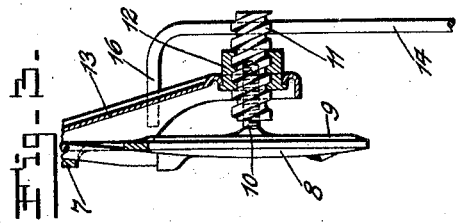
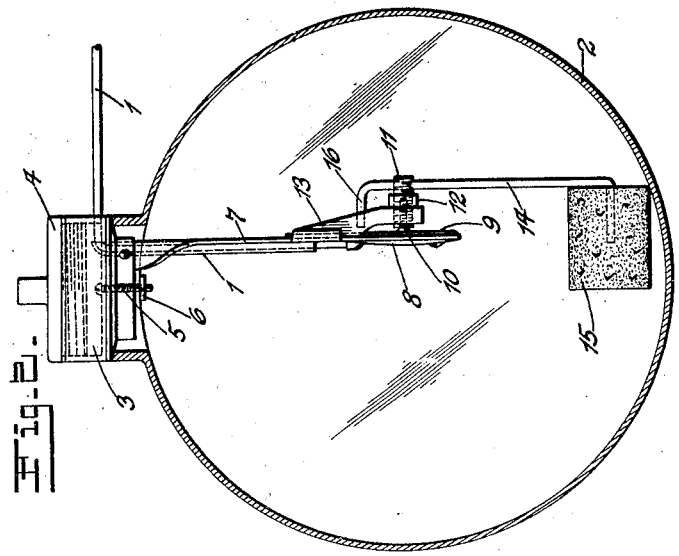
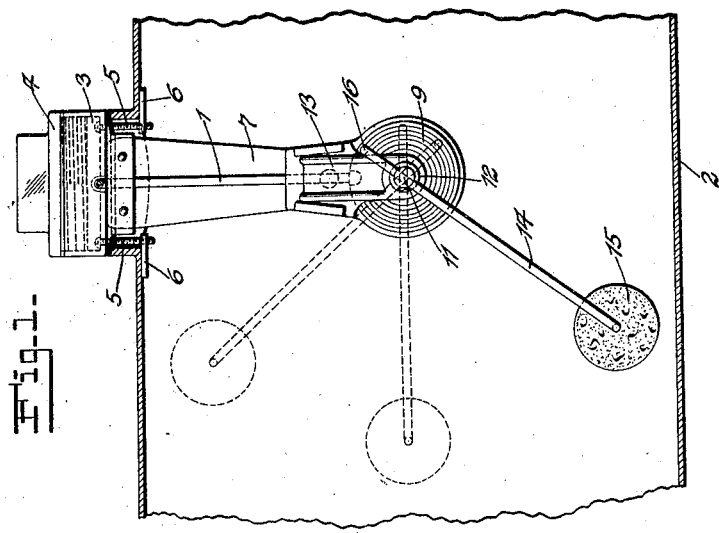
Inventor:
John G. Paty,
His Attorneys.

Dec. 27, 1927.
J. G. PATY
1,654,307
FUEL SUPPLY INDICATOR
Filed Dec. 7, 1925    2 Sheets-Sheet 2
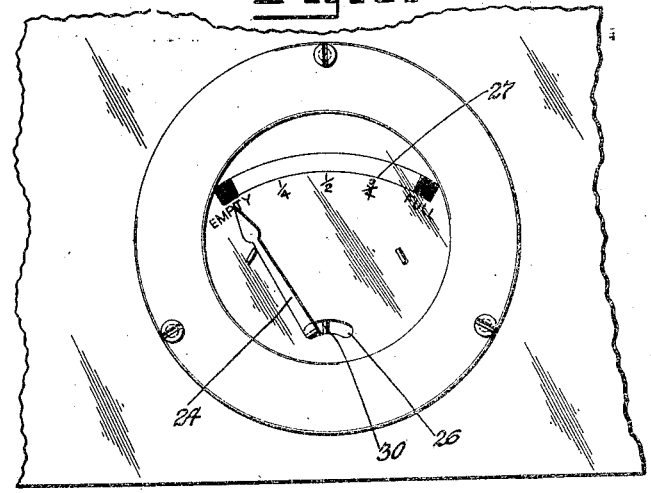
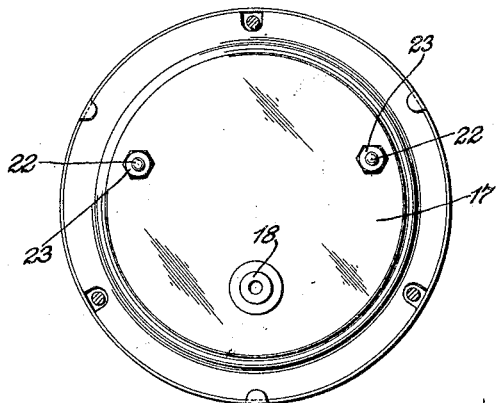
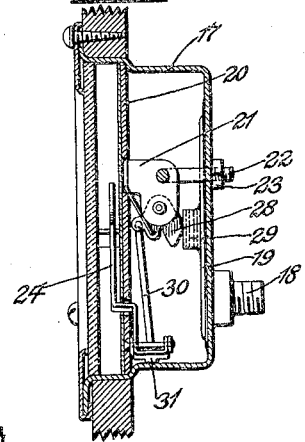
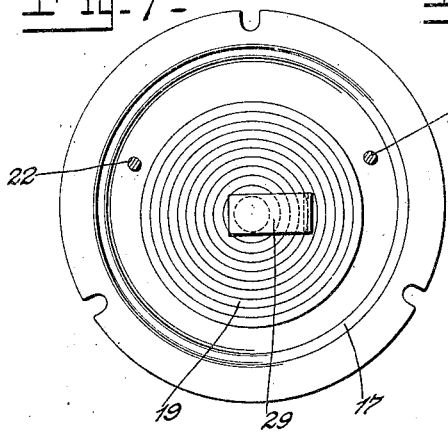
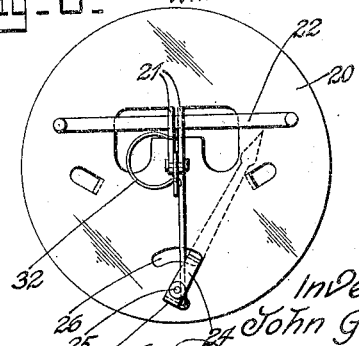
Inventor.
John G. Paty,
His Attorneys.

Patented Dec. 27, 1927.

1,654,307

UNITED STATES PATENT OFFICE.

JOHN G. PATY, OF ST. LOUIS, MISSOURI.

FUEL-SUPPLY INDICATOR.

Application filed December 7, 1925. Serial No. 73,701.

This invention relates to a fuel supply indicator to indicate the amount of fuel contained in a tank, and especially designed and adapted for use on automobiles.

An object of the invention is to provide an improved fuel supply indicator having an indicating instrument arranged to be operated by devices under control of a column of liquid leading from the instrument to the fuel tank, and mechanical means in the tank under control of the liquid to actuate the column of liquid and thereby the indicating instrument.

Another object of the invention is to provide actuating means for an indicating instrument comprising a column of liquid leading from the instrument to the actuating means, an expansible and contractible actuator for the column of liquid, and means for contracting the actuator in conformity with the rise of the level of liquid in the tank leaving the actuator free to expand and correspondingly withdraw the pressure of the column of liquid from the indicating instrument as the level of liquid in the tank lowers.

Other objects of the invention will appear from the following description, reference being made to the accompanying drawing, in which Fig. 1 is a side elevation of the actuator for the column of liquid leading from the fuel tank to the indicating instrument.

Fig. 2 is a side edge elevation.

Fig. 3 is an enlarged side edge elevation with parts in section.

Fig. 4 is an end elevation showing the face of the indicator.

Fig. 5 is a view of the opposite end of the indicator.

Fig. 6 is a longitudinal sectional view of the indicator.

Fig. 7 is a view looking toward the inner end of the indicator showing the diaphragm thereof.

Fig. 8 is a view of the face plate of the indicator showing the parts supported thereby.

My improved fuel supply indicator comprises a tube 1 leading from the fuel supply tank 2 to the indicating instrument mounted where it may be conveniently observed by the user. When used upon an automobile the indicating instrument is preferably mounted upon the instrument board.

The end of the tube 1 that extends into the tank 2 passes through a cylindrical wall 3 of the closure for the opening in the wall of the tank through which the actuator is passed into the tank. A removable cap 4 is screwed in connection with the wall 3 and may be removed to permit the tank to be filled with fuel, or for other purposes.

As shown, the device is held in connection with the tank by screws 5 engaging the part 3 and also engaging nuts or arms 6 which extend laterally against the inner side of the wall of the tank and constitute retaining elements to hold the device in rigid connection with the tank.

The end of the tube 1 that extends downwardly into the tank is seated in a longitudinal groove in an arm 7 depending from the support 3 and having a concaved disc portion 8 at its lower end forming a rigid wall of a chamber into which the end of the tube 1 opens. The opposite wall of said chamber is formed by a diaphragm 9 consisting of a disc arranged to be bulged or expanded away from the wall 8 to enlarge the capacity of the chamber. Since the tube 1 and the chamber formed by the rigid wall 8 and the resilient diaphragm wall 9 are filled with liquid, it is apparent that by pressing the wall 9 toward the wall 8 the column of liquid will be moved and this movement is utilized to actuate the pointer of the indicating instrument. It is also apparent that when the diaphragm wall 9 is expanded away from the rigid wall 8 part of the liquid from the tube 1 will be withdrawn into the chamber formed by the walls 8 and 9, thus relieving the pressure upon the indicating instrument and permitting the pointer to move or to be moved in the opposite direction from which it is moved by the pressure.

A threaded stem 10 is rigid with the diaphragm 9 and extends axially therefrom and is screwed into a rotary actuator 11 which is provided with external long-pitched threads that are screwed into a support 12 attached to an arm 13 projecting downwardly and laterally from the arm 7. As shown (Fig. 3) the external threads on the actuator 11 are of greater pitch than the threads on the stem 10. These parts are arranged so that when the actuator 11 is screwed through the support 12 toward the diaphragm it screws onto the stem 10 and presses the diaphragm 9 toward the rigid wall 8, thereby actuating the column of liquid toward the indicating instrument. When the actuator 11 is screwed in the opposite direction, i. e., away from the diaphragm 9, the diaphragm 9 is withdrawn or expanded away from the wall 8, thus enlarging the capacity of the chamber and withdrawing part of the liquid from the tube 1.

An arm 14 has rigid connection with the actuator 11 and carries a float 15 which is raised and lowered in accordance with the variation of the amount of liquid in the tank 2, thereby effecting corresponding variation in the capacity of the chamber composed of the rigid wall 8 and the diaphragm 9. A lateral projection 16 from the arm 14 will engage the arm 13 and prevent relative displacement of the parts.

An acceptable form of indicating instrument is shown on Sheet 2 of the drawing, the same comprising a housing 17 having an inlet passage 18 opening through the end wall and with which the tube 1 communicates. A diaphragm 19 is secured to the inner side of the end wall of the housing and receives the pressure of the column of liquid actuated as above described. A face plate 20 has a pair of inwardly extending arms 21 through which a clamping bracket 22 extends, the ends of said bracket also extending through the end wall of the housing and having nuts 23 screwed thereon.

A pointer 24 is mounted on a pivot 25 on the inside of the face plate 20 and projects through a slot 26 in the face plate, and cooperates with a dial 27 to indicate the amount of gasoline in the tank by responding to the variation in the pressure of the column of liquid. A lever 28 is pivoted between the arms 21 and has one end bearing against a projection 29 on the axis of the diaphragm 19, and its opposite end connected by a link 30 with a crank 31 on the end of the pointer 24. A spring 32 connecting the lever 28 with one of the arms 21 tends to actuate the parts to move the pointer 24 toward "Empty" position on the dial in response to diminution of pressure from the column of liquid. This spring 32 is approximately U-shaped (Fig. 8) and has one end connected with one of the arms 21 and the other end connected with the lever 28. The power of this spring 32 is exerted to actuate the lever 28 in a direction to move the pointer 24 to "Empty" position.

It will be noted that the bracket 22 is made adjustable so that it may be properly positioned by manipulation of the nuts 23 to effect adjustment between the lever 28 and the projection 29 on the axis of the diaphragm 19. This adjustment may be effected by screwing the nuts 23 onto the ends of the bracket 22 to bend the plate 20 toward the projection 29. Or, the nuts may be slightly loosened to permit the plate 20 to resume its original shape. The bracket 22 also serves to hold the face plate in connection with the housing so that it may be conveniently removed if desired for internal adjustment of the device.

The principle and mode of operation of my improved indicator will be readily understood from the foregoing description of the construction and operation of the component parts. The construction of the device may be varied within equivalent limits, and may be applied to various uses other than those specifically stated. I do not restrict myself in any unessential particulars, but what I claim and desire to secure by Letters Patent is:—

1. A device of the character described comprising walls forming an expansible and contractible chamber, a tube leading from and opening into said chamber, and together with said chamber constituting a liquid receptacle, a screw permanently secured to one wall of said chamber and extending laterally therefrom, a support spaced laterally from said chamber and having a threaded hole, a hollow internally threaded actuator screwed on said screw and extending through said hole in said support, worm screw threads on said actuator engaging the threads in said hole, the threads on said screw and the worm screw threads on said actuator being oppositely formed and of different pitch, and a float device for turning said actuator.

2. A device of the character described comprising a rigid wall forming one wall of a chamber, and an expansible and contractible diaphragm wall forming another wall of said chamber, a tube leading from and opening into said chamber and together with said chamber constituting a liquid receptacle, a stationary support spaced laterally from said diaphragm wall and having a threaded hole therethrough, an actuator screwed in said hole, a screw permanently secured to said diaphragm wall and screwed axially into said actuator, and a float device for rotating said actuator to move said diaphragm wall positively as required to expand and to contract the same.

3. A device of the character described comprising walls forming an expansible and contractible chamber, a tube leading from and opening into said chamber and together with said chamber constituting a liquid receptacle, a threaded element permanently secured to one wall of said chamber and extending laterally therefrom, threads on said element, a support spaced laterally from said chamber and having a threaded hole therethrough, an internally and externally threaded actuator screwed into said element and into said hole, the external threads on said actuator being of greater pitch than the internal threads, a float device for rotating said actuator, a movable element, and means controlled by the liquid contained in said chamber and said tube for actuating said movable element in conformity with the movement of said wall.

4. A device of the character described comprising a chamber having an expansible and contractible diaphragm wall, a tube leading from and opening into said chamber and together with said chamber constituting a liquid receptacle, liquid confined in and filling said chamber and said tube, a stationary support spaced from said diaphragm wall and having a threaded hole, a worm screw screwed in said hole and having internal threads of shorter pitch than the worm screw threads, a screw permarently secured to said diaphragm wall of said chamber screwed into said worm screw, a float device for rotating said worm screw to move said diaphragm wall positively as required to expand and to contract the same, a pivoted element, and means controlled by said liquid contained in said chamber and said tube for actuating said pivoted element in conformity with the movement of said wall by said screws.

JOHN G. PATY.